(12) United States Patent
Guenther et al.

(10) Patent No.: US 11,164,480 B2
(45) Date of Patent: Nov. 2, 2021

(54) BRAILLE TERMINAL AND MODULE FOR A BRAILLE TERMINAL

(71) Applicant: JOHNSON MATTHEY PIEZO PRODUCTS GMBH, Redwitz an der Rodach (DE)

(72) Inventors: Juergen Guenther, Redwitz an der Rodach (DE); Stefan Klump, Redwitz an der Roach (DE); Daniel Kuegel, Redwitz an der Rodach (DE); Martin Ruettel, Redwitz an der Rodach (DE); Daniel Schneiderbanger, Redwitz an der Rodach (DE)

(73) Assignee: Johnson Matthey Piezo Products GmbH, Rodach (DE)

( * ) Notice: Subject to any disclaimer, the term of this patent is extended or adjusted under 35 U.S.C. 154(b) by 157 days.

(21) Appl. No.: 16/497,169

(22) PCT Filed: Mar. 23, 2018

(86) PCT No.: PCT/GB2018/050774
§ 371 (c)(1),
(2) Date: Sep. 24, 2019

(87) PCT Pub. No.: WO2018/178642
PCT Pub. Date: Oct. 4, 2018

(65) Prior Publication Data
US 2020/0098287 A1  Mar. 26, 2020

(30) Foreign Application Priority Data
Mar. 29, 2017  (DE) ..................... 10 2017 205 373.9

(51) Int. Cl.
*G09B 21/00* (2006.01)

(52) U.S. Cl.
CPC .................... *G09B 21/004* (2013.01)

(58) Field of Classification Search
CPC .............. G09B 21/004; G09B 21/00
See application file for complete search history.

(56) References Cited

U.S. PATENT DOCUMENTS

| 4,283,178 A | 8/1981 | Tetzlaff |
| 7,367,806 B1 | 5/2008 | Murphy et al. |
| (Continued) | | |

FOREIGN PATENT DOCUMENTS

| DE | 202004017471 | 2/2005 |
| EP | 0281746 A1 | 9/1988 |
| GB | 2192479 A | 1/1988 |

OTHER PUBLICATIONS

PCT/GB2018/050774 International Search Report dated May 29, 2018.
PCT/GB2018/050774 Written Opinion, dated May 29, 2018.

*Primary Examiner* — Vinh T Lam
(74) *Attorney, Agent, or Firm* — BakerHostetler

(57) ABSTRACT

A braille terminal (2) which extends in a transverse direction (6) and which has a plurality of cells (26), wherein each cell (26) has a plurality of pins (28) that can be felt by a user and are arranged in a plurality of columns (32) and a plurality of rows (30), and wherein the cell (26) is designed to represent an individual character, wherein a respective pin (28) can be actuated in each case individually by means of a piezoelectric bending transducer (54), and the piezoelectric bending transducers (54) are secured on a plurality of printed circuit boards (52) has a plurality of modules (4) which are juxtaposed in the transverse direction (6) and which each have a module housing (12), wherein a plurality of cells (26) are integrated in the module (4).

14 Claims, 4 Drawing Sheets

(56) References Cited

U.S. PATENT DOCUMENTS

| | | | | |
|---|---|---|---|---|
| 7,462,034 B1* | 12/2008 | Murphy | ............... | G09B 21/003 |
| | | | | 434/112 |
| 2008/0280266 A1* | 11/2008 | Murphy | ............... | G09B 21/004 |
| | | | | 434/114 |
| 2009/0011391 A1* | 1/2009 | Van Hees | ............ | G09B 21/004 |
| | | | | 434/114 |
| 2013/0004922 A1* | 1/2013 | Takahashi | ............ | G09B 21/004 |
| | | | | 434/113 |
| 2013/0330692 A1* | 12/2013 | Karasin | ................... | G06F 3/011 |
| | | | | 434/113 |
| 2016/0284235 A1* | 9/2016 | Zhang | ..................... | G01S 11/12 |

* cited by examiner

BRAILLE TERMINAL AND MODULE FOR A BRAILLE TERMINAL

CROSS-REFERENCE TO RELATED APPLICATIONS

This application is the National Stage of International Patent Application No. PCT/GB2018/050774 filed Mar. 23, 2018, which claims priority to German Patent Application No. 10 2017 205 373.9, filed Mar. 29, 2017, the entire disclosures of both of which are incorporated herein by reference for any and all purposes.

The invention relates to a braille terminal which extends in a transverse direction and which has a plurality of cells, wherein each cell has a plurality of pins that can be felt by a user and are arranged in a plurality of columns and a plurality of rows, and wherein the cell is designed to represent an individual character, and wherein a respective pin can be actuated in each case by means of a piezoelectric bending transducer, and the piezoelectric bending transducers are secured on a plurality of printed circuit boards.

A braille terminal is generally a device, in particular an output device for the blind, in which individual characters are represented in the braille alphabet. Braille terminals or parts thereof are known, for example, from U.S. Pat. No. 4,283,178 A or U.S. Pat. No. 7,367,806 B1.

A respective individual character is represented by a predetermined number of tactile pins. Depending on the design variant, there are 6, 8 or even 10 pins per character.

A braille terminal is usually composed of a plurality of individual modules which are arranged next to each other. The modules are prefabricated components, wherein each module presents one cell, i.e. is designed to receive and drive the pins for precisely one character in each case.

Braille terminals are on the whole quite complicated to produce and are correspondingly cost-intensive.

Proceeding from this background, the object of the invention is to make available a braille terminal that is simple to produce and that is cost-effective.

According to a first aspect, the invention, the object is achieved by a braille terminal having the features of claim 1. The braille terminal extends in a transverse direction and has a plurality of cells. Each cell moreover has a plurality of pins that can be felt by a user and are arranged in a plurality of columns and a plurality of rows. There are usually two columns, and three, four or five rows. Each cell is designed to represent precisely one individual character. The individual pins can be actuated in each case individually by means of a piezoelectric bending transducer assigned to the respective pin. The piezoelectric bending transducers are moreover secured on a plurality of printed circuit boards. Opposite the printed circuit board, the bending transducers have a free end which, when suitably driven, is deflected in a vertical direction and thereby drives the respective pin, such that the latter alternates between a raised position and a retracted position in order to represent the respective character of a cell.

According to the invention, the braille terminal is formed by a plurality of modules which are juxtaposed in the transverse direction, wherein each module has a module housing, and a plurality of cells are integrated in the module housing.

In contrast to conventional braille terminals in which a respective module defined only one cell, bringing together a plurality of cells in a common module simplifies assembly and reduces costs. By bringing together a plurality of cells, for example three, four or five cells, in a common module housing, the total number of parts needed to produce the braille terminal is greatly reduced.

Since a braille terminal has a multiplicity of cells, typically at least 16 individual cells, often also 20, 40 or 80 individual cells, the larger braille terminals in particular can be assembled much more quickly and more easily from the modules having a plurality of cells. Moreover, lower tolerances can be achieved in this way. Overall, a compact structure of the entire braille terminal is also achieved.

Preferably, the columns can extend in a longitudinal direction perpendicular to the transverse direction. The printed circuit boards can be arranged in the module housing in a plurality of planes arranged above each other in a vertical direction. A plurality of individual bending transducers arranged next to each other in the transverse direction can be contacted and secured on each printed circuit board, wherein the bending transducers of a respective printed circuit board serve to drive the pins of a respective row of all cells of the module. Therefore, the pins of a respective row of a plurality of cells can be driven via an individual printed circuit board. A respective printed circuit board therefore generally can drive the pins of a plurality of cells.

Preferably, the module housings are closed overall. The respective module housing therefore has a bottom, an upper wall, side walls and front walls, such that a mechanically stable housing is formed overall. The module housing therefore has no skeleton structure. Except for a small number of passages, the module housing is enclosed all the way round by walls. In this way, the module housing overall has a robust design, and the components lie protected in an interior of the module housing.

Passages for the individual pins are preferably introduced into the upper wall. The pins can therefore driven in the interior of the module housing by the bending transducers and push through the upper wall and protrude above the upper wall.

Beneficially, an operating module is mounted on the upper wall in the region of these passages, which operating module has the pins extending through it. Moreover, in a preferred arrangement, the operating module has an actuating button for each cell of the module. The operating module is fitted in the manner of a cap onto the module housing and onto the upper wall. The pins protrude with particularly rounded heads above the upper face of the operating module when they are located in the deployed position. In the retracted position, the pins are drawn back in such a way that they no longer protrude above the upper face. By way of the actuating button, the user can for example in each case confirm the recognition of a particular character. The operating module typically has the same width in the transverse direction as the module housing.

Preferably, a holding plate is placed inside the operating module. Preferably, the holding plate is placed loosely in the operating module, i.e. without fixing, in particular also without even a releasable fixing, such as by a screw. The pins are guided individually through the holding plate. Moreover, the pins are held captive by the holding plate, such that the holding plate can be removed along with the pins held thereon, for example for inspection purposes or for cleaning purposes.

The pins may need to be cleaned at regular intervals. By virtue of the arrangement including the holding plate in which all the pins of a module are held, a module part is created that can be removed in one piece and that greatly simplifies handling, for example for cleaning purposes. The pins are preferably secured with form-fit engagement in the holding plate by having a widened portion on one side of the holding plate, in particular on the side oriented towards the head of the pin, which widened portion is larger than a corresponding hole in the holding plate.

In an expedient development, a master board is arranged on the upper face of the module housing, i.e. on the upper wall. By way of this master board, the individual printed circuit boards of the module housing can be supplied with control commands and with energy. The master board is in particular placed between the actuating buttons and the upper wall. A receiving space for the master board is thus generally formed between actuating buttons and the upper wall.

Generally, the master board provides a bus system via which the individual, serially interconnected modules for forming the braille terminal are driven and are supplied with energy.

To permit simple contacting and a simple assembly of the braille terminal, the master boards of adjacent modules can be connected to each other for electrical feeding of the signals and of supply voltages. For this purpose, the master boards can have laterally mounted plug connectors. During assembly, the individual modules simply have to be pushed together in the transverse direction. The laterally mounted plug connectors permit automatic alternate contacting of the master boards of adjacent modules. A respective master board can include contact pins at one edge and contact sockets at its opposite edge.

In addition to the passages for the pins, the upper wall preferably has at least one further passage for the electrical contacting of the printed circuit boards. The signals, supplies, etc., provided via the respective master board are therefore transmitted from the master board through the upper wall to the printed circuit board lying underneath.

To keep the contacting effort as low as possible, spring contacts can be formed on the upper face of the respective printed circuit board in order to electrically contact an underside of a printed circuit board lying above. In the case of the uppermost printed circuit board, the master board can be contacted via the spring contacts. Overall, this arrangement with direct contacting via spring contacts between the planes of individual printed circuit boards permits very simple contacting. In particular, in order to provide the supply voltage or the signals, it is not necessary to connect the individual printed circuit boards to each other by wires that would have to be soldered onto the printed circuit boards for example. The contacting of the individual printed circuit boards preferably takes place exclusively via the spring contacts.

This embodiment in particular permits simple assembly, since the contacting takes place automatically when the printed circuit boards are put together at their intended positions. Any tolerances can be compensated by the resilient mounting of the spring contacts. The spring contacts are preferably in the form of bent and stamped sheet-metal parts.

Moreover, in a preferred arrangement, signals for driving the individual pins and a supply voltage for the bending transducers can be routed serially in a loop via the individual printed circuit boards. The corresponding drive signals and the supply voltage are therefore provided via the master board and are initially tapped by the uppermost printed circuit board via the spring contacts. The signals and the supply voltage can then be forwarded via the next printed circuit board and so on to the last printed circuit board and then routed back again to the master board, such that overall there is a loop-shaped through-contact of the printed circuit boards.

In an expedient arrangement, each printed circuit board has a driver chip for driving the pins that are assigned to the printed circuit board. The master board can also be understood as a bus board via which the necessary drive signals are made available. This is customarily done in the manner of a shift register, and corresponding control signals are transmitted to the respective driver chip of the respective printed circuit board in particular via the above-described loop-shaped supply, which then converts the corresponding control commands and drives the bending transducers of the printed circuit board in a suitable manner.

With regard to the closed configuration of the module housing, the latter preferably has a front part and also a receiving cassette. The receiving cassette is closed at the front by the front part and is preferably more or less cuboid. The front wall of the receiving cassette opposite the front part is typically closed. The printed circuit boards are moreover secured to the front part, and the bending transducers secured to the printed circuit boards extend into the receiving well. The free ends of the bending transducers can therefore be located in the interior of the receiving cassette opposite the front part. The receiving cassette also has at least the greater part of the upper wall. The passages for the pins can be formed at that end of the receiving cassette opposite the front part. At this opposite end too, the operating module is also secured on the upper face of the receiving cassette.

Preferably, the front part for each printed circuit board has a insert well into which the respective printed circuit board can be inserted with one end. The insert wells define an assembly position of the printed circuit boards and thus the individual printed circuit board planes. The insert wells are positioned relative to each other in such a way that, upon insertion of the printed circuit boards, the reciprocal contacting takes place automatically via the spring contacts. In this way, the ease of installation is enhanced, since no additional contacting measures have to be taken.

Preferably, the module housing has transverse passages which lie opposite each other in the longitudinal direction and which extend in the transverse direction and have a connecting rod guided through them. The individual module housings can be fixed to each other in the transverse direction via this connecting rod.

According to a second aspect of the invention, the object is also achieved by a module having the features of claim 15 for such a braille terminal. The advantages of the preferred arrangements set out in respect of the braille terminal also apply analogously to the module.

An illustrative embodiment of the invention is explained in more detail below with reference to the figures which depict partly simplified views and in which.

Parts that have identical actions are provided with identical reference signs in the figures.

Figure 1:
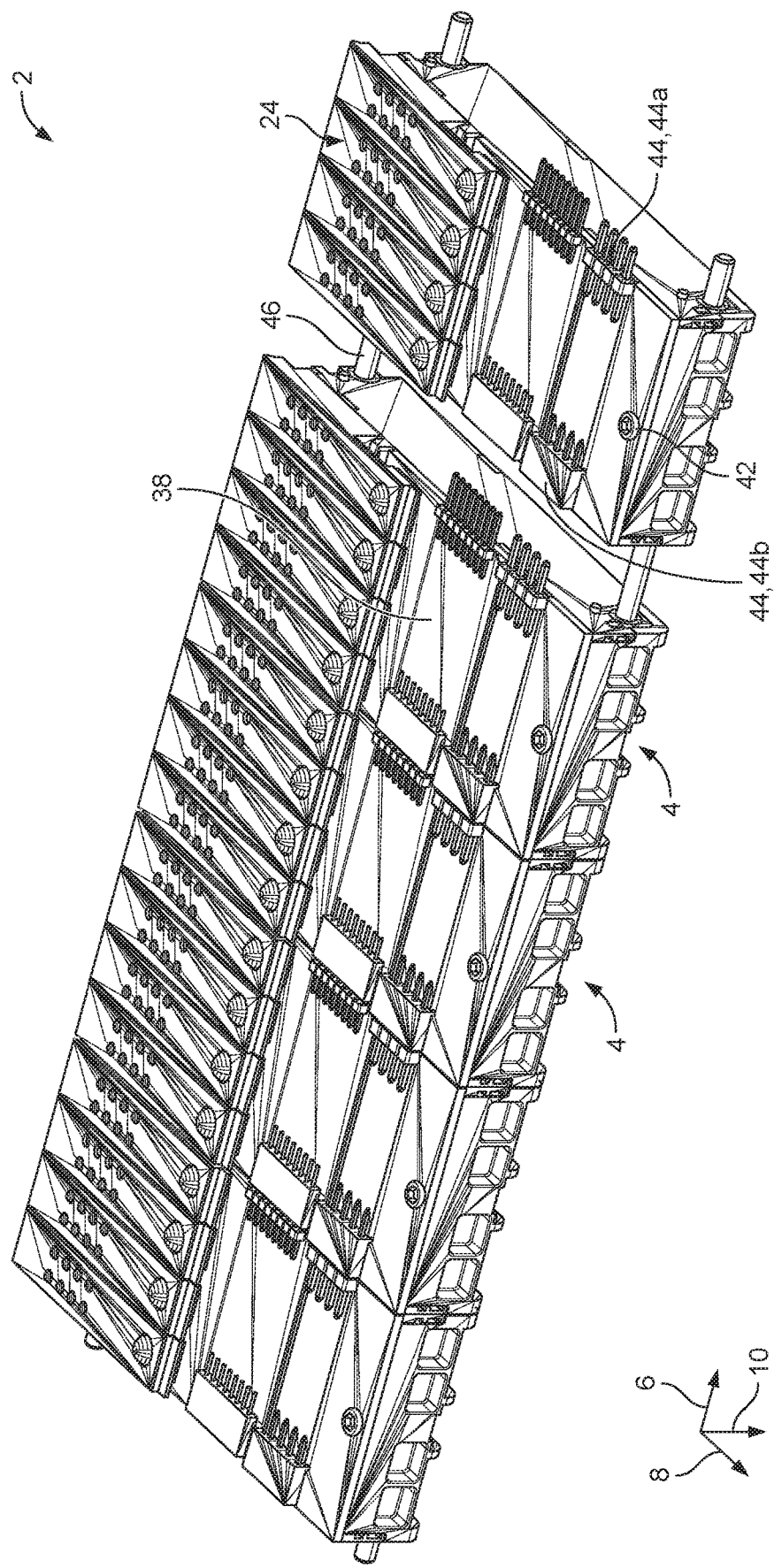
FIG. 1 shows a perspective view of a braille terminal.

The braille terminal 2 shown in FIG. 1 is composed of a plurality of individual modules 4. Five modules in total are shown in the illustrative embodiment. The individual modules 4 are juxtaposed in a transverse direction 6. The modules 4 themselves extend in a longitudinal direction 8 and have a height extending in a vertical direction 10.

Transverse direction 6, longitudinal direction 8 and vertical direction 10 are perpendicular to each other and form a Cartesian coordinate system.

Figure 2:
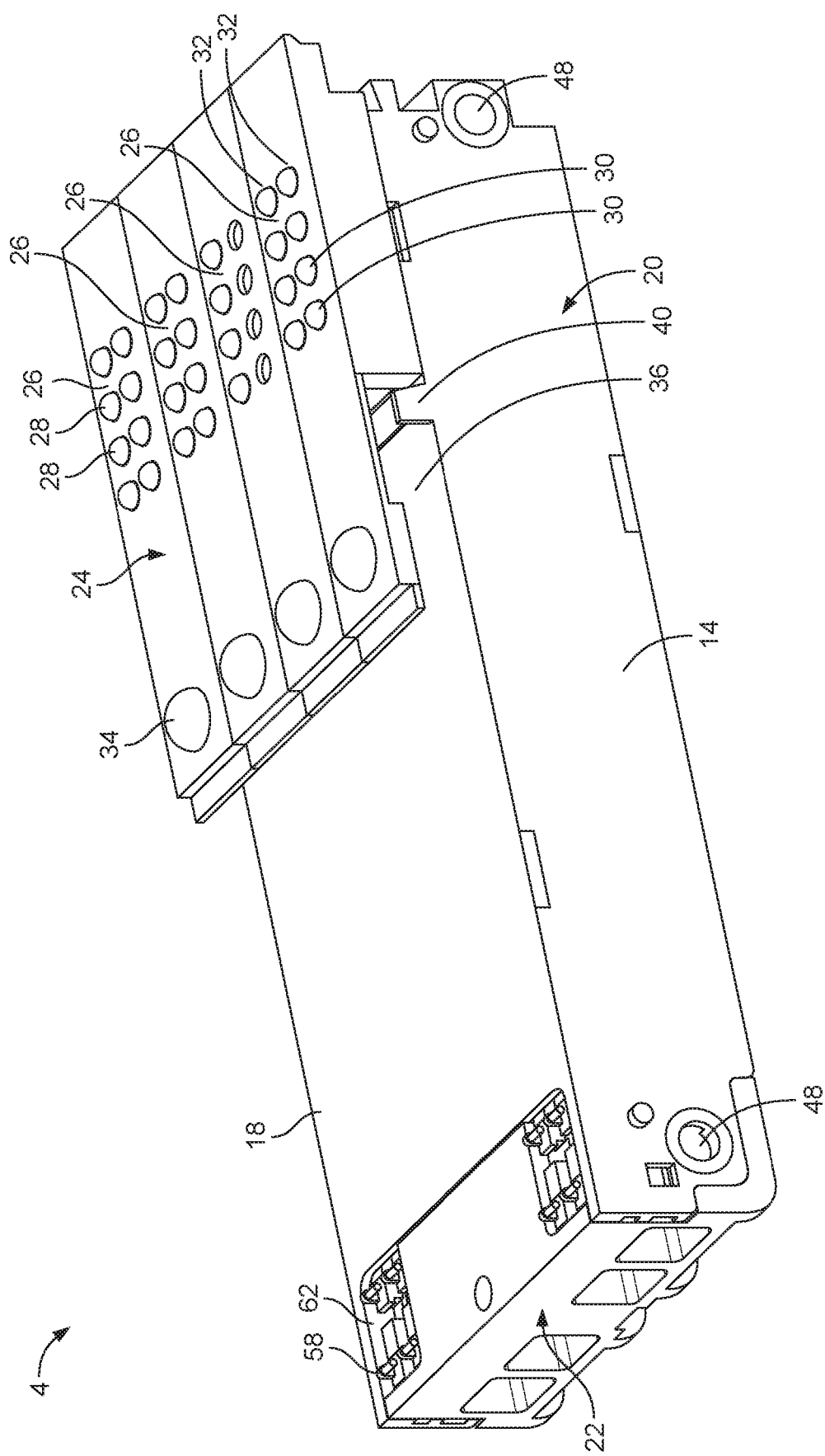
FIG. 2 shows a perspective view of a module.

The individual modules 4 (cf FIG. 2) each have a substantially closed module housing 12 which overall has a cuboid shape. The module housing 12 has plane side walls 14 lying opposite each other, a closed bottom (cf FIG. 5) and an upper wall 18. The side walls 14 and the bottom 16 and also a large part of the upper wall 18 form flat surfaces in the illustrative embodiment. In the case of the upper wall 18, this is true at least of a front subregion, which as a whole extends over approximately two thirds of the length of the module housing 12.

The module housing 12 is composed of a receiving cassette 20 and of a front part 22, which closes a front end of the receiving cassette 20.

An operating module 24 is mounted on the upper wall 18, at the side of the module housing 12 opposite the front part 22. This operating module 24 provides a plurality of cells 26, in the illustrative embodiment four cells 26, wherein each individual cell 26 is designed to represent an individual character in the braille alphabet.

For this purpose, a plurality of pins 28 are arranged in rows 30 and columns 32. In the illustrative embodiment, a respective cell 26 has two columns 32 and four rows 30. Therefore, a respective cell 26 has eight pins in total.

An actuating button 34 is assigned to each cell 26. The actuating buttons 34 are formed at the ends on brackets that protrude freely over the upper wall 18. The brackets are all more or less strip-shaped and each receive the pins 28 of a respective cell 26. By means of this configuration of brackets that protrude freely and are to be actuated individually and independently of each other, a receiving space 36 is formed between the brackets and between the operating buttons 34 and the upper wall (see in particular FIG. 2).

A master board 38 is generally arranged on the upper wall 18, which master board 38 is pushed with one end into this receiving space 36 and thus lies between the operating buttons 34 and the upper wall 18. The master board 38 is fixed by means of a clip 40, which in particular spans the entire width of the module housing 12. Opposite the clip 40, the master board is fixed to the module housing via a further fixing element, for example a screw 42, particularly in the region of the front part 22.

The actuating buttons 34 have contact elements on their underside and, when actuated, contact a corresponding contact field of the master board 38.

As will be seen in particular from FIG. 1, the master boards 38 of mutually adjacent modules 4 are serially contacted to each other. Plug connectors 44 are in each case arranged for this purpose. For this purpose, contact pins 44a protruding in the transverse direction are formed on one side, and a contact socket 44b is formed on the opposite side. The electrical contacting takes place automatically when the individual modules 4 are joined together.

The individual modules 4 are held on each other via connecting rods 46, which are routed through transverse passages 48 in the module housing 12. These transverse passages 48 are formed at opposite ends of the module housing 12.

Figure 4:
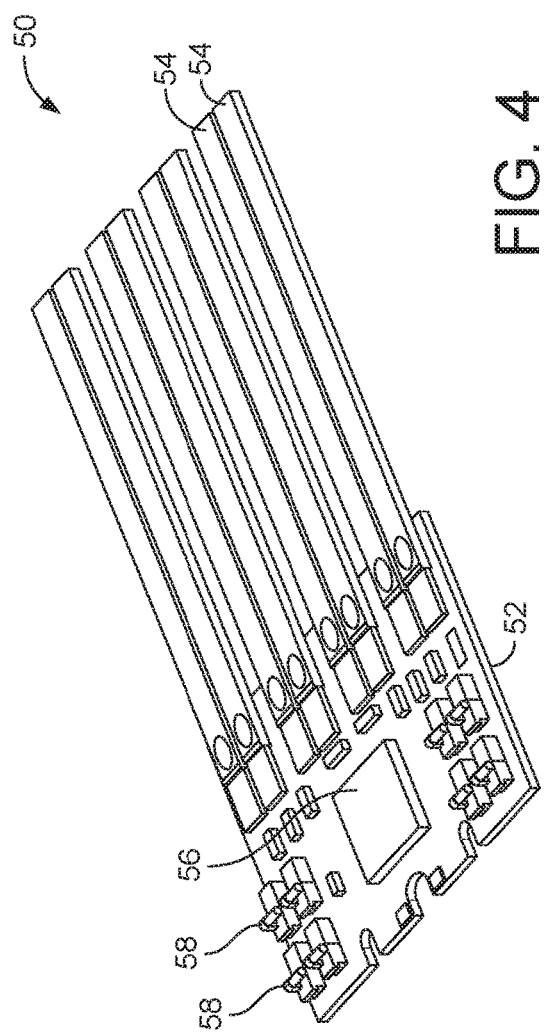
FIG. 4 shows a perspective view of a printed circuit board.

By way of the module housing 12, a free interior is defined which, in the illustrative embodiment, receives a total of four of the printed circuit board modules 50 shown in FIG. 4 and also the pins 28. The printed circuit board modules 50 are arranged above one another in a total of four planes in the vertical direction 10.

Figure 5:
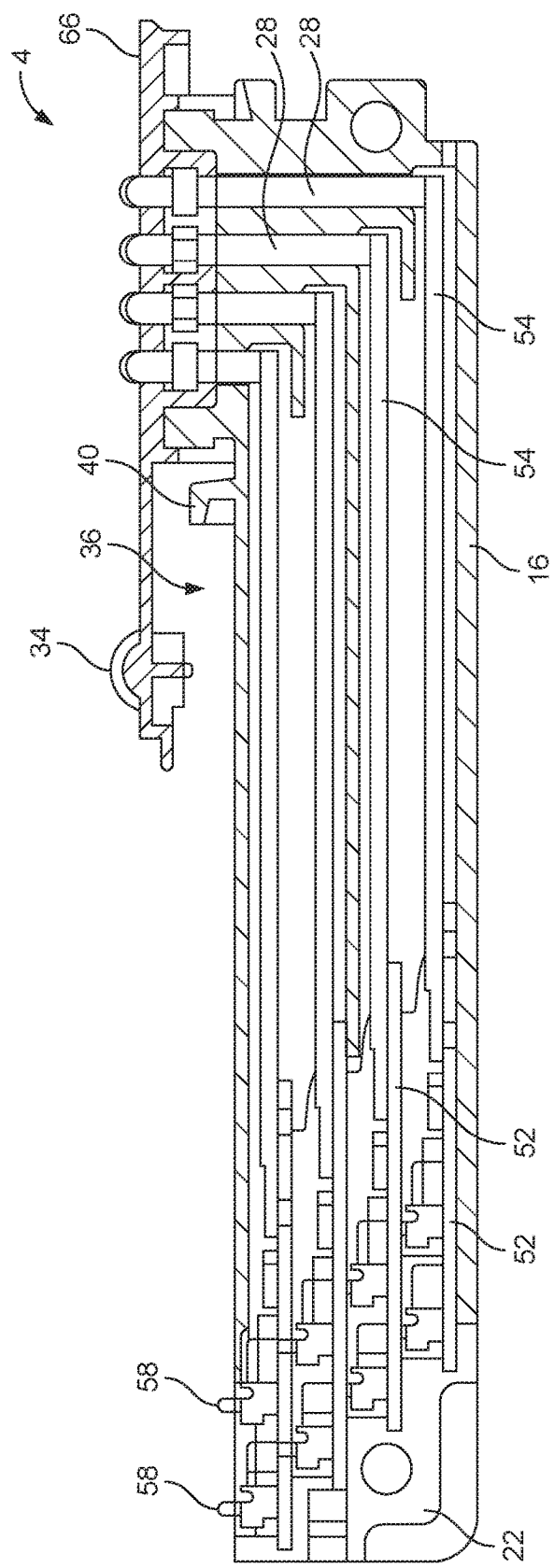
FIG. 5 shows a cross-sectional view through the module according to FIG. 2.

As can be seen in particular from the cross-sectional view in FIG. 5, the individual printed circuit board modules 50 are offset in relation to each other in the longitudinal direction 8, such that their free ends terminate at different length positions and at different height positions. This has the effect that a respective printed circuit board module 50 drives, with its free end, precisely one row 30 of the pins 28 across a plurality of cells 26. On account of the offset arrangement in different planes in the vertical direction 10, the pins 28 of the different rows 30 also have different lengths.

As will be seen in particular from FIG. 4, a respective printed circuit board module 50 has a printed circuit board 52 and bending transducers 54. The latter are fixed at one end to the printed circuit board 52 and electrically contacted and protrude freely from the printed circuit board 52 as far as the already mentioned free end. In the illustrative embodiment, precisely eight bending transducers 54 are arranged on each printed circuit board 52. A respective bending transducer 54 serves to drive a respective individual pin 28. Each printed circuit board module 50 moreover has a driver chip 56 and also a number of contact elements, which are designed specifically as spring contacts 58. These are, in particular, bent and stamped sheet-metal parts which are secured to the upper face of the printed circuit board 52. The spring contacts 58 each have an upwardly protruding, resiliently elastic bracket. This provides automatic contacting with the printed circuit board 52 lying above it or, in the case of the uppermost printed circuit board 52, with the master board 38 lying above it. For this purpose, in addition to passages 60 for the individual pins 28, the upper wall 18 of the module housing 12 has further passages 62, such that the spring contacts 58 of the uppermost printed circuit board 52 protrude above the upper face of the module housing 12. The spring contacts 58 contact the underside of the master board 38 lying on the upper wall 18. This permits tapping of the corresponding signals or supplies for the module 4.

In the illustrative embodiment, two groups of spring contacts 58 in total are formed which, viewed in the transverse direction, are arranged at opposite edges of the printed circuit board 52. Accordingly, only two further passages 62 are formed in the upper wall 18.

Eight spring contacts are provided in total. These provide in particular a supply voltage for the driver chip 56 (for example 5 volts), a high-voltage supply for driving the flexible transducers 54 (typically 200 volts), and also a contact connection for a clock, a connection for an input data signal, a connection for an output data signal, and also an enable connection and one or more ground connections.

The individual printed circuit boards 52 are each inserted into insert wells 64 of the front end 22. Upon insertion, the special configuration of the spring contacts 58 ensures that the individual printed circuit boards 52 arranged in the plurality of planes automatically contact each other. The signals, for example data input signals, are routed in a loop through the individual printed circuit boards 52 and back again to the master board 38. The same applies to the supply voltages.

Figure 3:
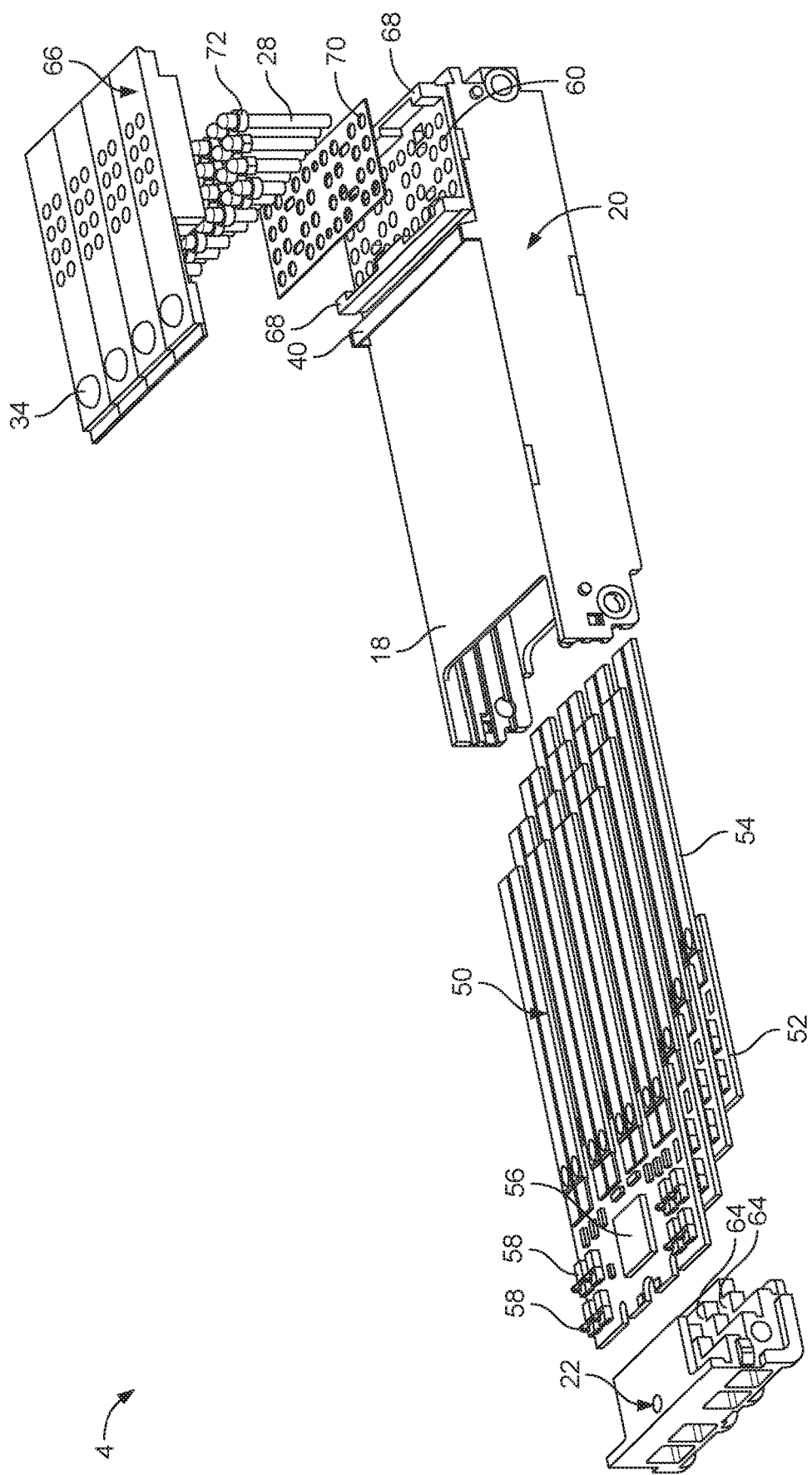
FIG. 3 shows an exploded view of the module shown in FIG. 2.

As can be seen in particular from FIG. 3, the operating module 24 is formed at the end of the module housing 12 opposite the front part 22. The operating module 24 has a one-piece, cap-shaped housing, designated as cap 66, which has passages for the individual pins 28 and also the operating buttons 34. This cap 66 is placed onto the module housing 12 from above. For this purpose, the module housing 12 has, for example, two opposite transverse webs 68 onto which the cap 66 is placed from above and thus fixed. The passages 60 for the pins 28 are introduced between the two transverse webs 68. A holding plate 70 is also placed, in particular loosely, between the cap 66 and the upper wall 18. The individual pins 28 are guided individually through this holding plate 70 and held thereon, such that the entire group of pins 28 can be removed together with the holding plate 70. The pins 28 are secured with form-fit engagement in particular in at least one direction. For this purpose, they have a widened portion 72 in the region of their rounded heads, as can be seen in particular from FIGS. 3 and 5.

LIST OF REFERENCE SIGNS 2 braille terminal
4 module
6 transverse direction
8 longitudinal direction
10 vertical direction
12 module housing
14 side wall
16 bottom
18 upper wall
20 receiving cassette
22 front part
24 operating module
26 cell
28 pin
30 row
32 column
34 actuating button
36 receiving space
38 master board
40 clip
42 screw
44 plug connector
44a contact pins
44b contact socket
46 connecting rod
48 transverse passage
50 printed circuit board module
52 printed circuit board
54 bending transducer
56 driver chip
58 spring contact
60 passages
62 further passage
64 insert well
66 cap
68 transverse web
70 holding plate
72 widened portion

The invention claimed is:

1. A braille terminal (2) which extends in a transverse direction (6) and which has a plurality of cells (26), wherein each cell (26) has a plurality of pins (28) that can be felt by a user and are arranged in a plurality of columns (32) and a plurality of rows (30), and wherein the cell (26) is designed to represent an individual character, wherein a respective pin (28) can be actuated in each case individually by means of a piezoelectric bending transducer (54), and the piezoelectric bending transducers (54) are secured on a plurality of printed circuit boards (52), characterized by a plurality of modules (4) which are juxtaposed in the transverse direction (6) and which each have a module housing (12), wherein the plurality of cells (26) are integrated in the module (4),
   wherein the columns (32) extend in a longitudinal direction (8) perpendicular to the transverse direction (6), wherein the plurality of printed circuit boards (52) are arranged above each other in the module housing (12) in a vertical direction which is perpendicular to the transverse direction and the longitudinal direction and, on each printed circuit board (52), a plurality of individual bending transducers (54) arranged next to each other in the transverse direction (6) are contacted and secured, wherein the bending transducers (54) of a respective printed circuit board (52) serve to drive the pins (28) of a respective row of a plurality of cells of the module (4).

2. The braille terminal (2) according to claim 1, wherein the module housing (12) has a closed design, with an upper wall (18) in which passages (60) for the pins (28) are introduced.

3. The braille terminal (2) according to claim 2, wherein, in a region of the passages (60), an operating module (24) is mounted on the upper wall (18), which operating module (24) has the pins (28) extending through it and has an actuating button (34) for each cell (26) of the module (4).

4. The braille terminal (2) according to claim 3, wherein a holding plate (70) is placed inside the operating module (24), through which holding plate (70) the pins (28) are guided individually, and in which the pins (28) are held captive in order to permit removal along with the holding plate (70).

5. The braille terminal (2) according to claim 3, wherein a receiving space (36), in which a master board (38) lies, is formed between the actuating buttons (34) and the upper wall (18).

6. The braille terminal (2) according to claim 5, wherein a plurality of master boards (38) of adjacent modules (4) are connected to each other via plug connectors (44) which are mounted laterally on the master boards (38) in order to permit serial interconnection of the individual modules (4).

7. The braille terminal (2) according to claim 2, wherein the upper wall (18) has a further passage (62) for electrical contacting of the printed circuit boards (52).

8. The braille terminal (2) according to claim 1, wherein, on an upper face of the respective printed circuit board (52), spring contacts (58) are formed in order to permit electrical contacting with an underside of the printed circuit board (52) arranged above.

9. The braille terminal (2) according to claim 1, arranged such that signals and a supply voltage are routed serially and in a loop via the individual printed circuit boards (52).

10. The braille terminal (2) according to claim 1, wherein, on each printed circuit board (52), a driver chip (56) is arranged for driving the pins (28) that are assigned to the printed circuit board (52).

11. The braille terminal (2) according to claim 1, wherein the module housing (12) has a front part (22) and also a receiving cassette (20) which is closed at the front by the front part (22), wherein the printed circuit boards (52) are secured on the front part (22), and the printed circuit boards (52) with the bending transducers (54) secured thereon extend into the receiving cassette (20).

12. The braille terminal (2) according to claim 11, wherein the front part (22) for each printed circuit board (52) has an insert well (64) into which the respective printed circuit board (52) can be inserted, in a process of which a mutual contacting of the printed circuit boards (52) takes place automatically via the spring contacts (58).

13. The braille terminal (2) according to claim 1, wherein the module housing (12) has transverse passages (48) which lie opposite each other in the longitudinal direction (8) and which extend in the transverse direction (6) and have a connecting rod (46) guided through them.

14. A module for a braille terminal (2) according to claim 1, which module has a module housing (12), wherein a plurality of cells (26) are integrated in the module housing (12), wherein each cell (26) has a plurality of pins (28) that can be felt by a user and are arranged in a plurality of columns (32) and a plurality of rows, and wherein the cell (26) is designed to represent an individual character, wherein a respective pin (28) can be actuated in each case individually by means of a piezoelectric bending transducer (54), and the piezoelectric bending transducers (54) are secured on a plurality of printed circuit boards (52), and wherein the columns (32) extend in a longitudinal direction (8) perpendicular to a transverse direction (6), characterized in that the plurality of printed circuit boards (52) are arranged above each other in the module housing (12) in a vertical direction which is perpendicular to the transverse and longitudinal directions and, on each printed circuit board (52), a plurality of individual bending transducers (54) arranged next to each other in the transverse direction (6) are contacted and secured, wherein the bending transducers (54) of a respective printed circuit board (52) serve to drive the pins (28) of a respective row of a plurality of cells of the module (4).

* * * * *